(12) United States Patent
Awate et al.

(10) Patent No.: US 11,080,402 B2
(45) Date of Patent: Aug. 3, 2021

(54) METHODS AND APPARATUS TO VALIDATE AND RESTORE MACHINE CONFIGURATIONS

(71) Applicant: VMware Inc., Palo Alto, CA (US)

(72) Inventors: Nilesh Awate, Pune (IN); Goresh Musalay, Pune (IN); Sachin Shinde, Pune (IN); V S V Vijay, Pune (IN)

(73) Assignee: VMware, Inc., Palo Alto, CA (US)

( * ) Notice: Subject to any disclaimer, the term of this patent is extended or adjusted under 35 U.S.C. 154(b) by 220 days.

(21) Appl. No.: 16/215,612

(22) Filed: Dec. 10, 2018

(65) Prior Publication Data

US 2019/0384914 A1 Dec. 19, 2019

(30) Foreign Application Priority Data

Jun. 14, 2018 (IN) .............................. 201841022336

(51) Int. Cl.
*G06F 21/57* (2013.01)
*G06F 21/60* (2013.01)
(Continued)

(52) U.S. Cl.
CPC .............. *G06F 21/57* (2013.01); *G06F 21/53* (2013.01); *G06F 21/602* (2013.01);
(Continued)

(58) Field of Classification Search
CPC ........ G06F 21/57; G06F 21/53; G06F 21/602; G06F 2212/152; G06F 2221/00;
(Continued)

(56) References Cited

U.S. PATENT DOCUMENTS

2002/0069200 A1* 6/2002 Cooper ................... H04L 41/22
2009/0077133 A1* 3/2009 Hsu ........................ G06F 16/122
(Continued)

OTHER PUBLICATIONS

Holmes et al.,"Ensuring Good with VMware", https://blogs.vmware.com/networkvirtualization/2017/09/ensuring-good-appdefense.html/, Sep. 5, 2017, 14 pages.
(Continued)

*Primary Examiner* — Jung W Kim
*Assistant Examiner* — Howard H. Louie
(74) *Attorney, Agent, or Firm* — Hanley, Flight & Zimmerman, LLC

(57) ABSTRACT

Methods and apparatus to validate and restore machine configurations are disclosed herein. An example apparatus includes a context identifier to obtain first context information for a first set of configuration update events occurring on a computing device, a guest agent interface to transmit the first set of configuration update events to a security manager for generation of a policy, the policy including allowable configuration update events and responses to unallowable configuration update events, an event comparator to compare second context information of a subsequent configuration update event obtained by the context identifier to the policy received from the security manager, and an event handler to determine, when the subsequent configuration update event is not included in the policy, that the subsequent configuration update event is to be transmitted to the security manager for generation of an updated policy.

22 Claims, 9 Drawing Sheets

(51) Int. Cl.
  *H04L 12/24* (2006.01)
  *G06F 21/53* (2013.01)
  *H04N 21/443* (2011.01)

(52) U.S. Cl.
  CPC ..... *H04L 41/0893* (2013.01); *H04N 21/4437* (2013.01); *G06F 2212/152* (2013.01); *G06F 2221/00* (2013.01); *G06F 2221/034* (2013.01)

(58) Field of Classification Search
  CPC ............... G06F 2221/034; G06F 21/60; H04L 41/0893; H04L 12/24; H04N 21/4437
  See application file for complete search history.

(56) References Cited

U.S. PATENT DOCUMENTS

| | | | | |
|---|---|---|---|---|
| 2012/0311341 | A1* | 12/2012 | Paris | G06F 21/57 713/179 |
| 2016/0182569 | A1* | 6/2016 | Kapoor | H04L 63/1416 726/1 |
| 2016/0299778 | A1* | 10/2016 | Barak | G06F 21/56 |
| 2019/0294800 | A1* | 9/2019 | Andrews | G06F 21/554 |
| 2019/0334952 | A1* | 10/2019 | Dhoble | H04L 63/10 |

OTHER PUBLICATIONS

"VMware AppDefense—Secure Datacenter Endpoints", http://docs.hol.vmware.com/HOL-2018/hol-1842-01-net_html_en/#c218518, accessed on Jun. 11, 2018, 62 pages.

* cited by examiner

METHODS AND APPARATUS TO VALIDATE AND RESTORE MACHINE CONFIGURATIONS

RELATED APPLICATION

This patent claims priority to and the benefit of Indian Provisional Patent Application Serial No. 201841022336, which was filed on Jun. 14, 2018. Indian Provisional Patent Application Serial No. 201841022336 is hereby incorporated by reference in its entirety.

FIELD OF THE DISCLOSURE

This disclosure relates generally to security of computing devices, and, more particularly, to methods and apparatus to validate and restore machine configurations.

BACKGROUND

In recent years, security vulnerabilities in products and/or services have been attacked by ever-changing security attacks (e.g., malware, ransomware, etc) that present constant, new threats to the security of computing devices. Such security attacks have caused data corruption, allowed access to and/or the conversion of otherwise prohibited content, information, privileges, etc., caused disclosure of private information, caused monetary loss, caused reputational damage, etc. Accordingly, constant effort is made to keep pace with the ever-increasing number and variety of security attacks.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Virtual machines have critical configurations and/or components (e.g., registry, firewall rules, critical applications, etc.) that should be closely monitored to ensure security of the virtual machine. Some applications running on the virtual machine may attempt to perform updates to these critical components. Such updates may be monitored by a security administrator to determine whether the update is to be allowed or blocked. In some examples, a security administrator addresses each of the updates and determines the action to be taken (e.g., blocking the update, allowing the update, etc.).

Difficulty arises in some cases when a security administrator must monitor an enterprise that includes hundreds or even thousands of virtual machines. Monitoring and/or validating updates to the critical configurations of such a large group of virtual machines is cumbersome, and responding in a timely fashion becomes impractical. Further, if the security administrator fails to take timely action, the integrity of the virtual machine and/or the operating system (OS) can potentially be compromised. Solutions to this problem can be difficult for the security administrator, who must manually revert the virtual machine to a last known trusted configuration (e.g., prior to the malicious update or action) and/or must block the update from happening for future instances.

Therefore, there is a need for a method for monitoring large enterprises (e.g., enterprises including hundreds or thousands of virtual machines) and providing security solutions (e.g., blocking activity, restoring a virtual machine, etc.) to the virtual machines included in the enterprise. Examples disclosed herein include a guest agent installed on virtual machines that are to be monitored, and use the guest agents to develop and enforce a policy or policies (e.g., rules regulating allowed behavior of applications running on the virtual machine). The guest agent is capable of learning the behavior of the virtual machine and continually improving the policy to provide a high level of protection.

Figure 1:
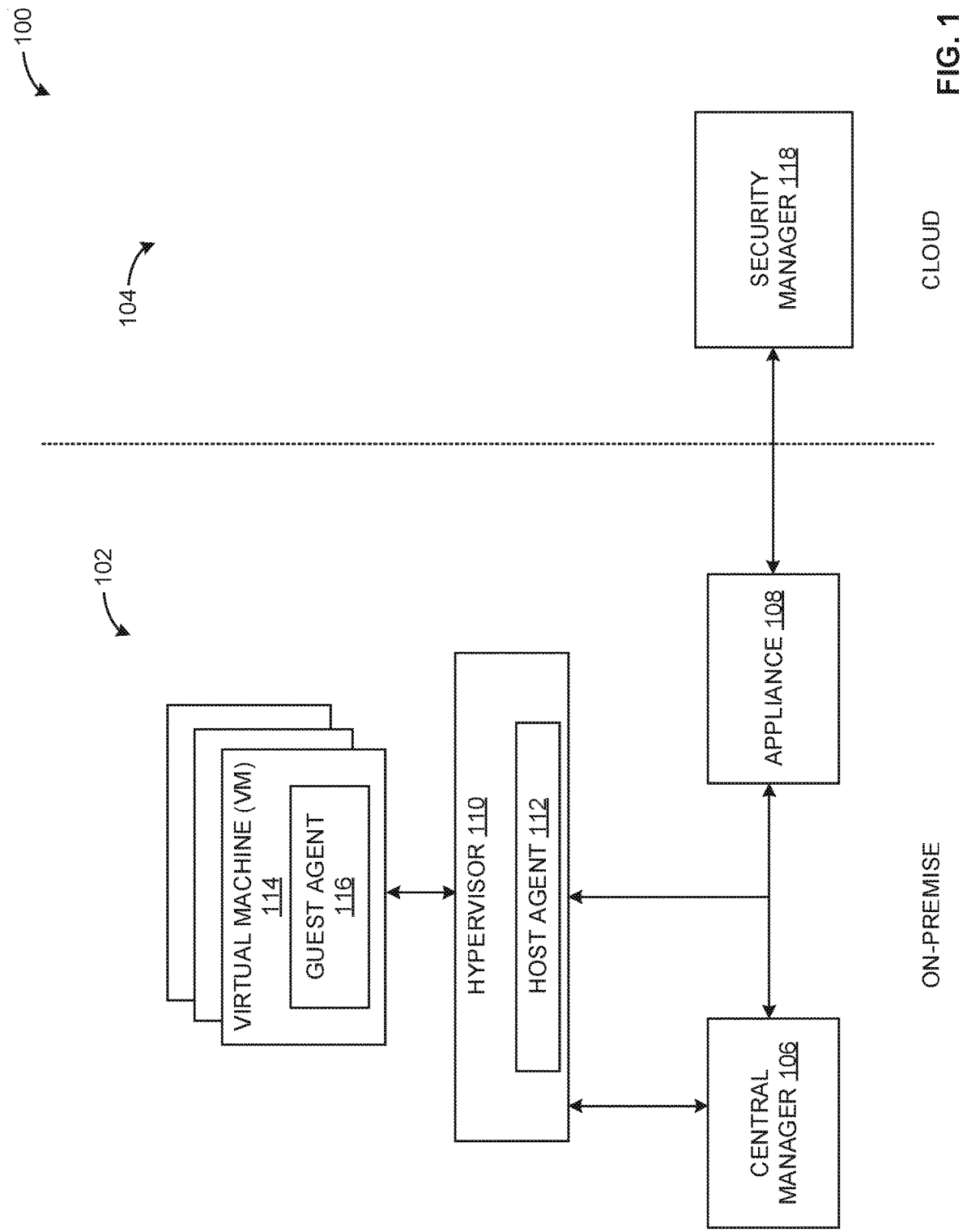
FIG. 1 is an example environment within which the teachings of this disclosure may be implemented.

FIG. 1 is an example environment 100 within which the teachings of this disclosure may be implemented. The example environment 100 includes on-premise components 102 and cloud components 104. The on-premise components 102 include an example central manager 106, an example appliance 108, an example hypervisor 110, an example host agent 112, an example virtual machine (VM) 114, and an example guest agent 116. The cloud components 104 include the example security manager 118.

In operation, the guest agent 116 is installed on the virtual machine 114. In the illustrated example, multiple virtual machines 114 are included in the on-premise components 102. Each virtual machine 114 includes a guest agent 116. Although reference is made to a single virtual machine 114 in some examples, the examples disclosed herein can be implemented using any number of virtual machines 114. The guest agent 116 is configured to load early in the boot process of the virtual machine 114 (e.g., before applications that are to be monitored by the guest agent 116). In some examples, the guest agent 116 loads after an early launch antimalware (ELAM) driver. For example, the guest agent 116 may be implemented as a kernel driver. Alternatively, the guest agent 116 may be implemented as a user space application that is configured to load early in the boot process. The example guest agent 116 further registers for configuration update events from an operating system (OS) of the virtual machine 114. In some examples, the guest agent 116 hooks the operating system to receive registry updates. In some examples, the guest agent monitors firewall rules (e.g., by accessing a log of firewall actions).

In the illustrated example, the guest agent 116 takes a snapshot of critical components of the virtual machine 114 at the beginning of operation (e.g., when the guest agent 116 loads early in the boot process). In some examples, the snapshot is a golden image (e.g., a template for the virtual machine 114).

The example guest agent 116 is in communication with the host agent 112 located on the hypervisor 110. The host agent 112 operates in tandem with the guest agent 116 to monitor activity on the virtual machine 114, enforce actions on the virtual machine 114, and/or transfer data or information. Because the example host agent 112 runs on the hypervisor 110, the host agent 112 is protected from malicious activity on the virtual machine 114. In some examples, the hypervisor 110 monitors a section of memory used by the guest agent 116 (e.g., code pages associated with the guest agent 116) and prevents any changes or modifications to that section of the memory. In the illustrated example, the central manager 106 is communicatively coupled to the hypervisor 110 and the appliance 108 and manages the virtual machines 114. In some examples, the central manager 106 determines how many virtual machines 114 are connected to the hypervisor 110 and information about each of the virtual machines 114 (e.g., a version, applications running on the virtual machines 114, etc.).

The example hypervisor 110 is communicatively coupled to the multiple virtual machines 114 grouped together in scopes. As used herein, a scope refers to a homogeneous group of virtual machines 114 sharing one or more characteristics (e.g., function, operating system (OS), etc.). Because the scopes include the virtual machines 114 used for similar purposes or having similar characteristics, it is possible to use one policy for the entire scope. As used herein, a policy refers to a set of rules for the host agent 112 and/or the guest agent 116 to enforce during operation of the virtual machines 114. The rules of the policy are set in place to prevent unauthorized updates to critical components or other protected information on the virtual machines 114.

The host agent 112 and the guest agent 116 of the illustrated example operate in two modes: audit mode (also referred to herein as learning mode) and production mode (also referred to herein as protective mode). In audit mode, the host agent 112 and the guest agent 116 do not have a policy, and collect information used by the security manager 118 to develop a policy. In the illustrated example, the guest agent 116 monitors activity on the virtual machine 114 (e.g., processes of applications running on the virtual machine 114). The guest agent 116 is particularly interested in configuration update events. As used herein, a configuration update event is any operation that updates or in any way modifies the critical components or other protected information on the virtual machine 114 (e.g., the critical components included in the snapshot).

When a configuration update event occurs, the example guest agent 116 collects context information associated with the configuration update event. In some examples, the context information includes one or more of a binary image path, cryptographic hash, command line information, a type of protocol (e.g., User Datagram Protocol (UDP), Transmission Control Protocol (TCP), etc.), and/or any other information associated with the configuration update event. The guest agent 116 then transmits the context information to the host agent 112. The host agent 112 further transmits the context information to the example security manager 118 by transmitting the context information to the example appliance 108, which relays the context information to the security manager 118.

The appliance 108 is software, hardware, firmware, etc. to transmit information (e.g., the context information) between the on-premise components 102 and the cloud components 104 (e.g., the security manager 118). For example, the appliance 108 may be a software application including an operating system (e.g., iOS, Linux, etc.) that handles a transfer or information, such as context information, policy information, etc., between the on-premise components 102 and the cloud components 104. In some examples, the appliance 108 includes hardware (e.g., memory) and/or chipsets to facilitate the transfer of information between the on-premise components 102 and the cloud components 104. Additionally or alternatively, the appliance 108 may use hardware resources of a computer (e.g., memory, storage, processing power, etc.) and an operating system e.g., iOS, Linux, etc.) to transmit information between the on-premise components 102 and the cloud components 104.

The security manager 118 of the illustrated example uses the context information collected by the guest agent 116 to determine the rules of the policy. For example, the security manager 118 can determine that an action (e.g., an update or other modification) is allowed to take place on the virtual machine. In some examples, the example security manager 118 determines that a configuration update event is not allowed and should be blocked by the guest agent 116 on the virtual machine 114. In some examples, an administrator determines a rule or rules based on the collected context information. The security manager 118 adds the rules to the policy and transmits the policy to the guest agent 116 (e.g., via the appliance 108). In some examples, the security manager 118 continually updates the policy at the guest agent 116 (e.g., by sending policy updates to the guest agent 116) while in audit mode. Additionally or alternatively, the security manager 118 sends the policy only after ceasing to operate in audit mode.

In some examples, the on-premise components 102 and cloud components 104 operate in audit mode for a predetermined period of time (e.g., a week, two weeks, etc.). In some other examples, an administrator determines when to switch between audit mode and production mode. In production mode, the guest agent 116 has received the policy, which includes instructions as to the configuration update events that are allowable and those that should be prevented.

The policy determined by the example security manager 118 includes a whitelist (e.g., a list of approved events) of allowable behavior. As used herein, allowable behavior refers to actions, modifications, or updates (e.g., configuration update events) that are allowed on the virtual machine 114. While in production mode, the guest agent 116 monitors the virtual machine 114 and compares the context information of each configuration update event to the corresponding information included in the allowable behavior of the policy. In some examples, the guest agent 116 compares the binary image path, cryptographic hash, and/or command line information of the configuration update event to the corresponding information in the whitelist.

When the context information of the configuration update event matches an allowed behavior in the whitelist, the example guest agent 116 allows the configuration update event to occur. However, if the context information does not match the allowed behavior, the guest agent 116 attempts to block the configuration update event. In some examples, the configuration update event has not occurred, and the guest agent 116 is able to block the update from occurring. The guest agent 116 then transmits an alert to the security manager 118 (e.g., via the appliance 108) including information regarding the configuration update event, the context information, the action taken by the guest agent 116 (e.g., blocking the update), and/or any other relevant information. In some alternative examples, the configuration update event has already occurred. In such examples, the guest agent 116 uses the snapshot to restore the virtual machine to a trusted configuration. The virtual machine 114 is thus protected from any negative impacts caused by the configuration update event. After restoring the virtual machine 114 based on the snapshot, the guest agent 116 sends an alert to the security manager 118 (e.g., including the same information as the alert sent for a blocked configuration update event).

In some examples, the context information and configuration update event do not have corresponding information in the policy (e.g., there is no rule addressing the configuration update event). In such examples, the guest agent 116 blocks the unknown configuration update event and sends an alert to the security manager 118. The security manager 118 determines the response that should be made to the configuration update event (e.g., allow, block, etc.) and whether any updates are to be made to the policy. In some examples, the security manager 118 determines a change to the policy and transmits instructions to the guest agent 116 at the virtual machine 114. The example on-premise components 102 and the example cloud components 104 are thus building a policy by learning activities of the example virtual machine 114 and creating a policy based on those activities.

Figure 2:
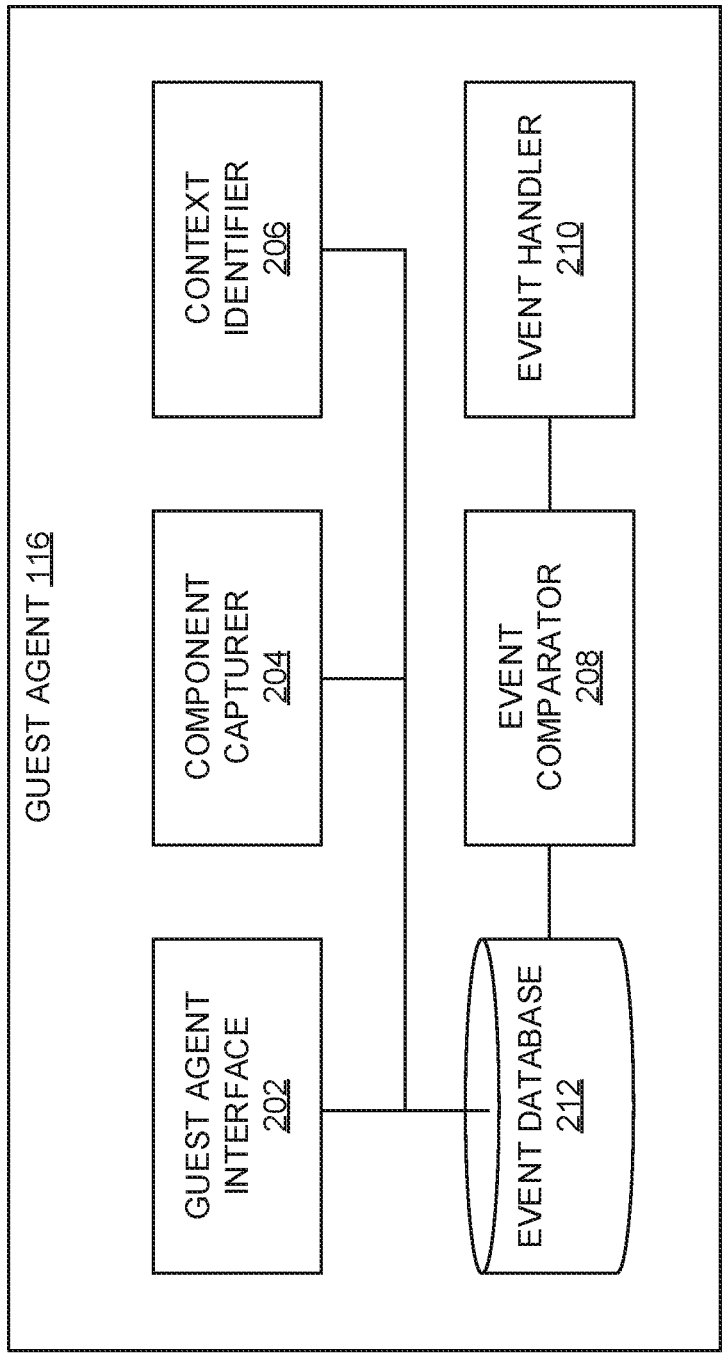
FIG. 2 is a block diagram of an example implementation of the example guest agent of FIG. 1.

FIG. 2 is a block diagram of an implementation of the example guest agent 116 of FIG. 1. The guest agent 116 of the illustrated example is loaded on a virtual machine (e.g., the virtual machine 114 of FIG. 1). In some alternative examples, the guest agent 116 may be an application running on a physical server. In the illustrated example, the guest agent 116 includes an example guest agent interface 202, an example component capturer 204, an example context identifier 206, an example event comparator 208, an example event handler 210, and an example event database 212.

In operation, the guest agent 116 is loaded early in the boot process to ensure applications on the virtual machine 114 cannot perform actions (e.g., updates, modifications, etc.) prior to operation of the guest agent 116. Once the guest agent 116 has been loaded, the component capturer 204 of the illustrated example takes a snapshot of the critical components and/or other protected components within the virtual machine 114. The component capturer 204 is communicatively coupled to the event database 212. The snapshot is transmitted to the event database 212 and stored for later use.

The example guest agent 116 can operate in audit mode or production mode. The guest agent 116 monitors registry updates, new process events (e.g., new process installation, instantiation, etc.), a file event, a network connection event, etc. In some examples, the guest agent 116 defaults to audit mode so that any new installation of an agent starts in audit mode. In audit mode, the context identifier 206 determines context information associated with configuration update events that occur within the virtual machine 114. For example, the context identifier 206 determines the binary image path, cryptographic hash, command line information, and/or other information associated with the configuration update events. The context identifier 206 is further communicatively coupled to the event database 212, and stores context information associated with configuration update events in the event database 212.

The example guest agent interface 202 is communicatively coupled to the event database 212 and accesses information stored therein. While in audit mode, the guest agent interface 202 accesses the context information in the event database 212 and transmits the context information to a security manager (e.g., the security manager 118 of FIG. 1). In some examples, the context information is transmitted to the security manager 118 via the example host agent 112 and the example appliance 108 of FIG. 1. When the guest agent 116 ceases to operate in audit mode, the guest agent interface 202 receives a policy from the security manager 118 including rules based on the context information. The guest agent interface 202 stores information associated with the policy in the event database 212. If updates to the policy and/or other instructions are transmitted to the guest agent 116, the guest agent interface 202 receives the instructions and stores them in the event database 212.

In some examples, a security administrator (e.g., located at the example security manager 118) switches the guest agent 116 to production mode. In some examples, the guest agent 116 changes to production mode once the policy has been received and audit mode has ended. In production mode, the context identifier 206 collects context information for each configuration update event and transmits the context information to the event database 212. The example event comparator 208 then retrieves the context information associated with the configuration update event, as well as allowed behavior included in the policy, from the event database 212. The event comparator 208 further compares the information included in the context information (e.g., binary image path, cryptographic hash, etc.) with the allowed behavior of the policy. The results of the comparison are then output to the example event handler 210.

Based on the results of the comparison, the example event handler 210 determines an action to be taken regarding the configuration update event. When the event comparator 208 determines that the context information matches allowed behavior, the event handler 210 allows the configuration update event to occur. In some examples, the event comparator 208 determines that there is a mismatch between the context information and the allowed behavior. In such an example, the event handler 210 determines that the configuration update event is to be blocked and/or the virtual machine 114 is to be restored to a previous configuration (e.g., using the snapshot taken by the component capturer 204). The event handler 210 blocks an event that has not yet occurred, and restores the virtual machine 114 when the event has already occurred. For example, if an update to the configuration has occurred, the event handler 210 retrieves the snapshot form the event database 212 and restores the virtual machine 114 to a trusted state based on the snapshot. Once the event handler 210 blocks the configuration update event and/or restores the virtual machine 114, the guest agent interface 202 transmits an alert to the security manager 118. In some examples, the alert includes information regarding the action taken (e.g., allowed, blocked, restored), context information, and/or other information needed by the security manager 118.

In some examples, the event comparator 208 determines that the context information does not have corresponding information in the policy. In such an example, the event handler 210 blocks the configuration update event from occurring. Further, the guest agent interface 202 transmits an alert to the security manager 118. In some examples, the guest agent interface 202 receives instructions to update the policy (e.g., adding a rule based on the unknown configuration update event) based on the previously unknown configuration update event.

While an example manner of implementing the guest agent 116 of FIG. 1 is illustrated in FIG. 2, one or more of the elements, processes and/or devices illustrated in FIG. 2 may be combined, divided, re-arranged, omitted, eliminated and/or implemented in any other way. Further, the example guest agent interface 202, the example component capturer 204, the example context identifier 206, the example event comparator 208, the example event handler 210, the example event database 212, and/or, more generally, the example guest agent 116 of FIG. 2 may be implemented by hardware, software, firmware and/or any combination of hardware, software and/or firmware. Thus, for example, any of the example guest agent interface 202, the example component capturer 204, the example context identifier 206, the example event comparator 208, the example event handler 210, the example event database 212, and/or, more generally, the example guest agent 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example guest agent interface 202, the example component capturer 204, the example context identifier 206, the example event comparator 208, the example event handler 210, the example event database 212, and/or the example guest agent 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example guest agent 116 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, a periodic intervals, and/or one-time events.

Figure 3:
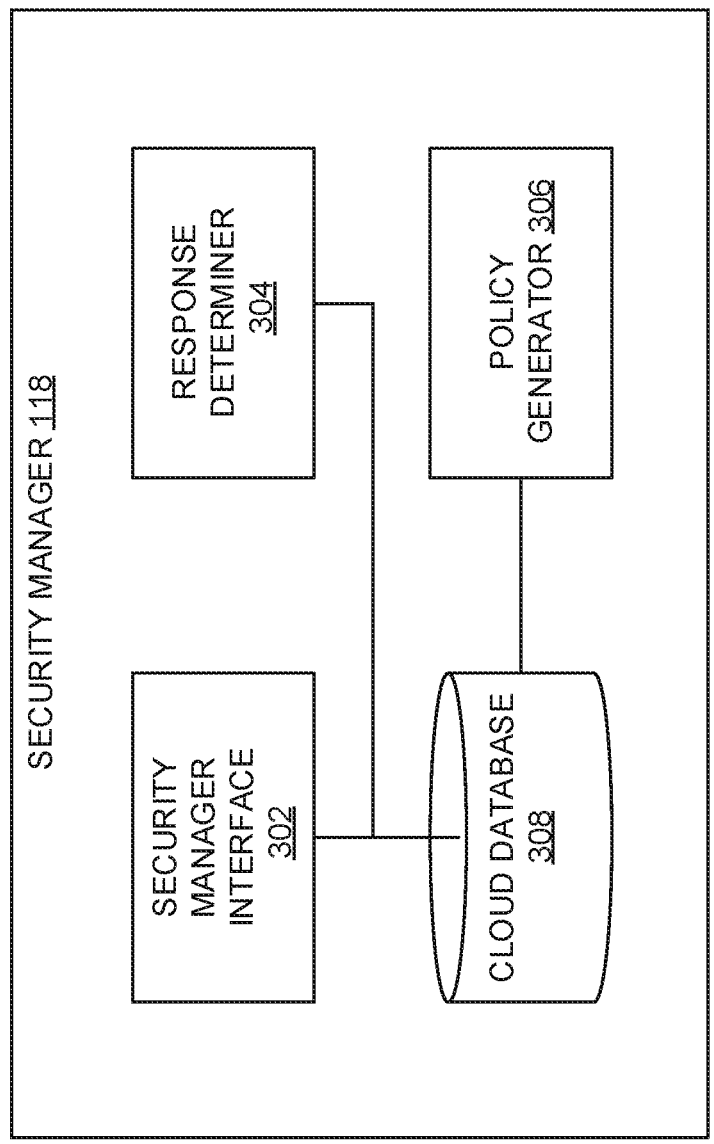
FIG. 3 is a block diagram of an example implementation of the example security manager of FIG. 1.

FIG. 3 is a block diagram of an example implementation of the example security manager 118 of FIG. 1. The example security manager 118 includes an example security manager interface 302, an example response determiner 304, an example policy generator 306, and an example cloud database 308.

In operation, the security manager interface 302 receives context information from the example guest agent 116 of FIGS. 1 and/or 2. The security manager interface 302 is communicatively coupled to the cloud database 308 and stores the received context information in the cloud database 308.

In the illustrated example, the policy generator 306 accesses the context information stored in the cloud database 308 and creates rules based on the context information, compiling the rules into a policy. As the security manager 118 receives more context information from the guest agent 116, the policy generator 306 continues to create rules to develop the policy further. When the security manager 118 and the guest agent 116 cease to operate in audit mode, the policy generator 306 finalizes the policy. The security manager interface 302 transmits the finalized policy from the security manager 118 to the guest agent interface 202. In some examples, the security manager 118 transmits the policy (e.g., from the security manager interface 302) to the guest agent 116 before the guest agent 116 ceases to operate in audit mode.

While in production mode, the security manager interface 302 receives alerts from the guest agent 116 regarding configuration update events that have been blocked and/or have caused the virtual machine 114 to be restored to a previous configuration (e.g., a trusted configuration). In some examples, the alert is accompanied by an alarm that notifies a security manager of the alert. The alerts are accessed by the response determiner 304, which determines a response to each alert. In some examples, the response determiner 304 determines that no changes need to be made to the policy and/or that the action taken by the guest agent 116 to address the configuration update event was correct. In some examples, the response determiner 304 determines that a change must be made to the policy. In some such examples, the response determiner 304 determines the updates to the policy and the security manager interface 302 transmits instructions to the guest agent 116 to update the policy. The response determiner 304 additionally updates the policy stored in the could database 308. In some examples, the response determiner 304 is given a response by a security administrator.

While an example manner of implementing the example security manager 118 of FIG. 1 is illustrated in FIG. 3, one or more of the elements, processes and/or devices illustrated in FIG. 3 may be combined, divided, re-arranged, omitted, eliminated and/or implemented in any other way. Further, the example security manager interface 302, the example response determiner 304, the example policy generator 306, the example cloud database 308, and/or, more generally, the example security manager 118 of FIG. 3 may be implemented by hardware, software, firmware and/or any combination of hardware, software and/or firmware. Thus, for example, any of the example security manager interface 302, the example response determiner 304, the example policy generator 306, the example cloud database 308, and/or, more generally, the example security manager 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example security manager interface 302, the example response determiner 304, the example policy generator 306, the example cloud database 308, and/or the example security manage 118 is/are hereby expressly defined to include a non-transitory computer readable storage device or storage disk such as a memory, a digital versatile disk (DVD), a compact disk (CD), a Blu-ray disk, etc. including the software and/or firmware. Further still, the example security manager 118 of FIG. 1 may include one or more elements, processes and/or devices in addition to, or instead of, those illustrated in FIG. 3, and/or may include more than one of any or all of the illustrated elements, processes and devices.

Figure 4:
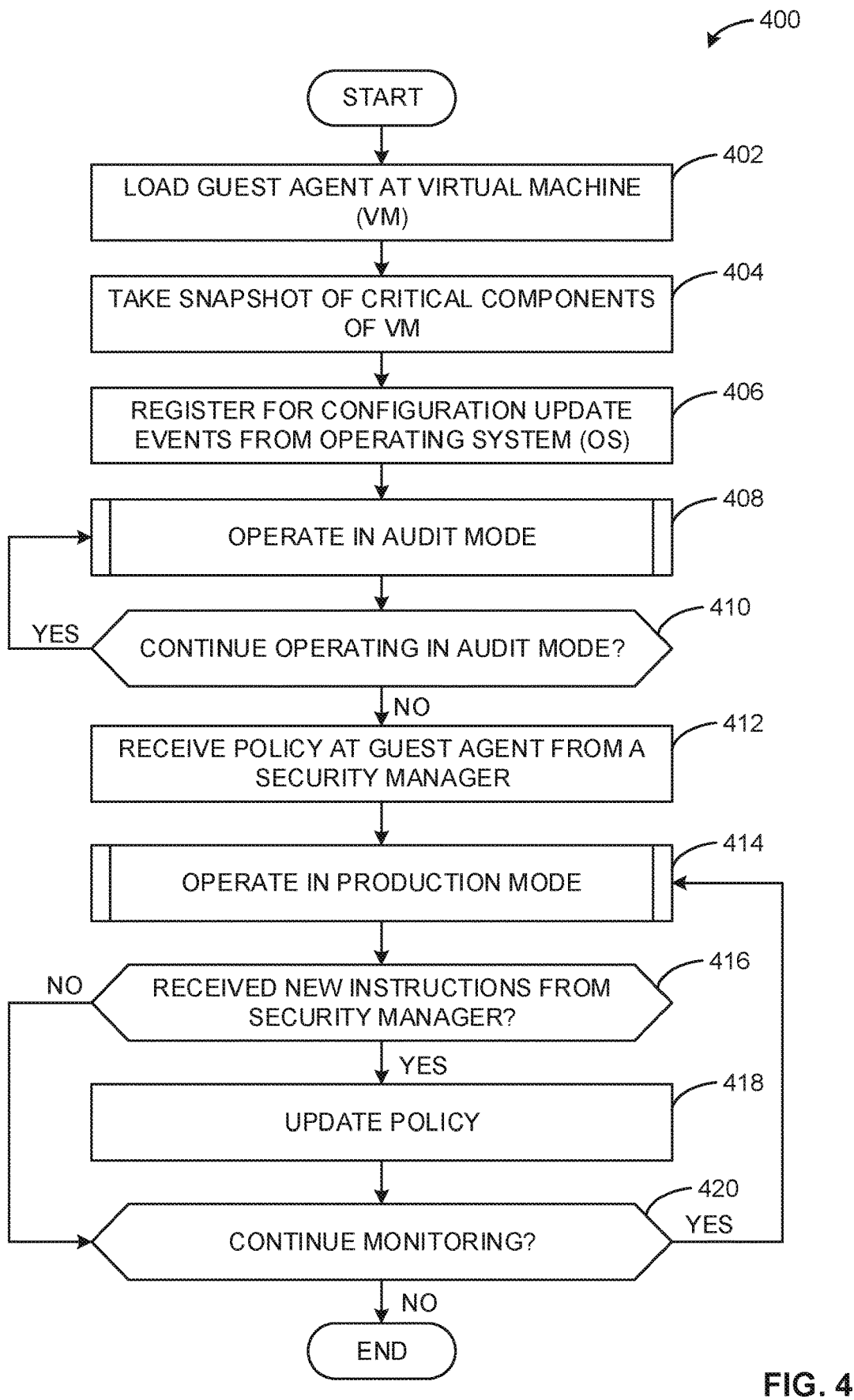
FIG. 4 is a flowchart representative of machine readable instructions which may be executed to implement the example guest agent of FIGS. 1 and/or 2 to monitor activity of a virtual machine.
Figure 5:
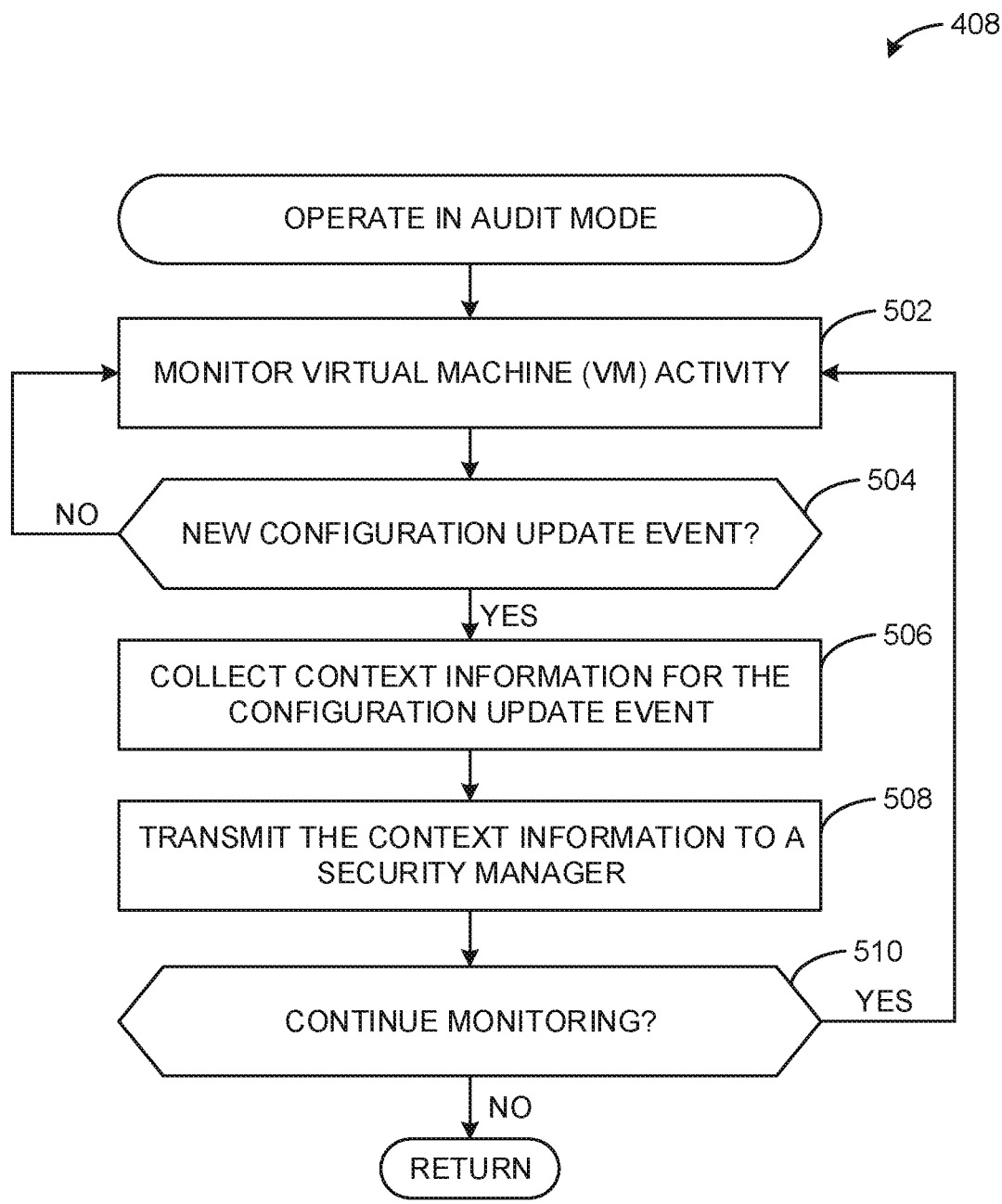
FIG. 5 is a flowchart representative of machine readable instructions which may be executed to implement the example guest agent of FIGS. 1 and/or 2 to collect information used to create a policy.
Figure 6:
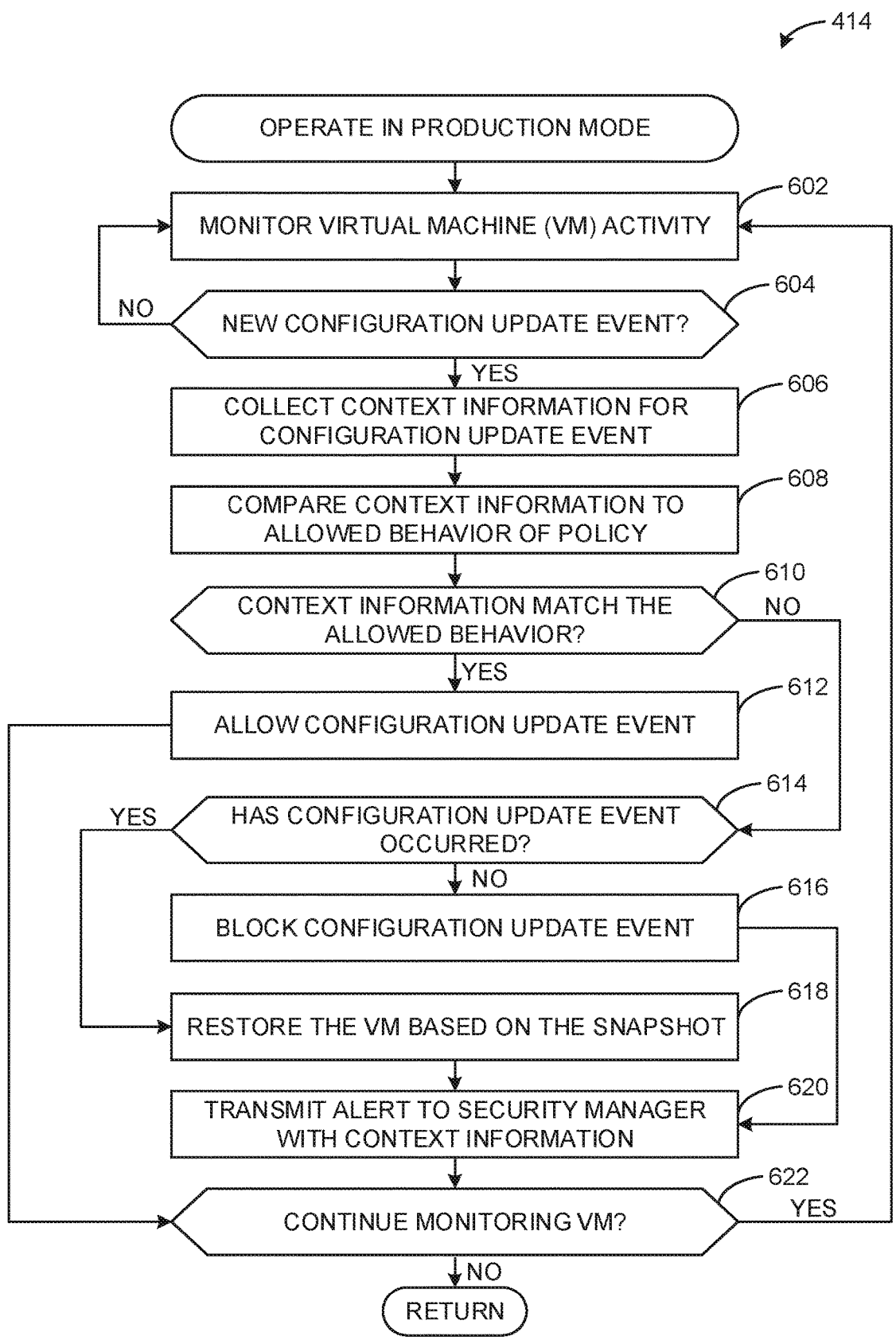
FIG. 6 is a flowchart representative of machine readable instructions which may be executed to implement the example guest agent of FIGS. 1 and/or 2 to validate and/or invalidate configuration update events.

Flowchart representative of example hardware logic, machine readable instructions, hardware implemented state machines, and/or any combination thereof for implementing the guest agent 116 of FIGS. 1 and/or 2 are shown in FIGS. 4-6. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-6, many other methods of implementing the example guest agent 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 4 is a flowchart representative of machine readable instructions which may be executed to implement the example guest agent of FIGS. 1 and/or 2 to monitor activity of a virtual machine. The example program of FIG. 4 begins at block 402 where the guest agent 116 is loaded at a virtual machine (VM) (e.g., the virtual machine 114 of FIG. 1). In some examples, the guest agent 116 loads early in the boot process. For example, the guest agent 116 can load after (e.g., directly after) an early launch anti malware (ELAM) driver during the boot process.

At block 404, the guest agent 116 takes a snapshot of the critical components of the virtual machine 114. For example, the component capturer 204 captures an image (e.g., a golden image) of the critical components of the virtual machine 114 after the guest agent 116 is loaded.

At block 406, the guest agent 116 registers for configuration update events from an operating system (OS) of the virtual machine 114. At block 408, the guest agent 116 operates in audit mode. In some examples used herein, audit mode is referred to as learning mode. An example of the guest agent 116 operating in audit mode is described in connection with FIG. 5 below.

At block 410, the guest agent 116 determines whether to continue operating in audit mode. In some examples, the guest agent 116 will determine a threshold time (e.g., one week, two weeks, etc.) to operate in audit mode. When the guest agent 116 determines that it will continue operating in audit mode, control of program 400 returns to block 408. Alternatively, if the guest agent 116 determines that it will no longer operate in audit mode, control of program 400 proceeds to block 412.

At block 412, the guest agent 116 receives a policy from an example security manager (e.g., the security manager 118 of FIGS. 1 and/or 3). The policy determines behavior allowed at the virtual machine while the guest agent 116 is in operation.

At block 414, the guest agent 116 operates in production mode. An example of the guest agent 116 operating in production mode is described in connection with FIG. 6 below.

At block 416, the guest agent 116 determines whether new instructions were received from the security manager 118. In some examples, new instructions are received from the security manager 118 when a new configuration update event (e.g., a configuration update event not included in the policy) is encountered. When the guest agent 116 determines that new instructions were received from the security manager 118, the program 400 proceeds to block 418. On the other hand, when the guest agent 116 deter mines that new instructions were not received, control of program 400 proceeds to block 420.

At block 418, the guest agent 116 updates the policy (e.g., the policy received at block 412). For example, the guest agent 116 can receive instructions from the security manager 118 for updating the policy when a new rule has been created.

At block 420, the guest agent 116 determines whether to continue monitoring the virtual machine 114. When the guest agent 116 determines that it will continue monitoring, control of program 400 returns to block 414. When the guest agent determines that it will not continue monitoring, the program 400 concludes.

FIG. 5 is a flowchart representative of machine readable instructions which may be executed to implement the example guest agent 116 of FIGS. 1 and/or 2 to collect information used to create a policy. The example program 408 begins at block 502, the guest agent 116 monitors virtual machine (VM) activity (e.g., the virtual machine 114 of FIG. 1). At block 504, the guest agent 116 determines whether a new configuration update event has occurred (e.g., at the virtual machine 114). When a new configuration update event has occurred, control of program 408 proceeds to block 506. On the other hand, if no new configuration update event has occurred, control of program 408 returns to block 502 to continue monitoring activity of the VM until a new configuration event occurs.

At block 506, the guest agent 116 collects context information for the configuration update event. In some examples, context information includes a binary image path, a cryptographic hash, command line information, and/or any other information associated with the configuration update event.

At block 508, the guest agent 116 transmits the context information to a security manager (e.g., the security manager 118 of FIGS. 1 and/or 3). For example, the guest agent 116 transmits context information to the example host agent 112 of FIG. 1 located at the example hypervisor 110 of FIG. 1. The host agent 112 further transmits the context information to the example appliance 108 of FIG. 1, which transmits the context information to the example security manager 118 of FIG. 1. At block 510, the guest agent 116 determines whether to continue monitoring the activity of the virtual machine 114. When the guest agent 116 determines that it will continue monitoring activity, control of the process returns to block 502. If the guest agent determines instead that it will not continue monitoring the virtual machine (e.g., because the virtual machine 114 has been monitored for a predetermined amount of time), the program 408 concludes, returning to block 410 of program 400.

FIG. 6 is a flowchart representative of machine readable instructions which may be executed to implement the example guest agent of FIGS. 1 and/or 2 to validate and/or invalidate configuration update events. The example program 414 begins at block 602 where the guest agent 116 monitors virtual machine (VM) activity (e.g., the virtual machine 114 of FIG. 1).

At block 604, the guest agent 116 determines whether a new configuration update event has occurred. When the guest agent 116 determines that a new configuration update event has occurred, control of program 414 proceeds to block 606. When the guest agent 116 determines that a new configuration update event has not been received, control of program 414 returns to block 602, where the program monitors the virtual machine 114 until a new configuration update event occurs.

At block 606, the guest agent 116 collects context information for the configuration update event. In some examples, context information includes a binary image path, a cryptographic hash, command line information, and/or any other information associated with the context information.

At block 608, the guest agent 116 compares the context information (e.g., collected at block 606) to allowed behavior of the policy (e.g., the policy received at block 410 of program 400). For example, the event comparator 208 of FIG. 2 can compare the cryptographic hash of the configuration update event to the cryptographic hash of an allowed behavior of the policy.

At block 610, the guest agent 116 determines whether the context information matches the allowed behavior (e.g., of the policy). For example, the event comparator 208 can determine whether the cryptographic hash of the configuration update event matches the cryptographic hash of the allowed behavior. When one or more elements of the context information match the corresponding elements of the allowed behavior, control of program 414 proceeds to block 612. On the other hand, if the context information does not match the allowed behavior of the policy, control of program 414 proceeds to block 614.

At block 612, the guest agent 116 allows the configuration update event. For example, when the context information associated with the configuration update event matches the allowed behavior of the policy, the configuration update event is permitted to update configuration information (firewall rules, critical application settings, etc.). In some examples, the guest agent 116 takes a snapshot of a critical configuration of the example virtual machine 114 after allowing the configuration update event, creating a new updated snapshot of the critical configuration. When the guest agent 116 has allowed a configuration update event, control of the program 414 proceeds to block 622.

At block 614, the guest agent 116 determines whether the configuration update event has occurred. For example, the event handler 210 can determine whether the configuration update event has already occurred or whether it has not yet occurred. When the guest agent 116 determines that the configuration update event has not occurred, control of program 414 proceeds to block 616. When the configuration update event has occurred, control of program 414 proceeds to block 618.

At block 616, the guest agent 116 blocks the configuration update event (e.g., stops the configuration update event before it occurs). For example, the event handler 210 of FIG. 2 blocks an application from accessing, altering, and/or updating configuration information before the configuration update event takes place.

At block 618, the guest agent 116 restores the virtual machine based on the snapshot (e.g., the snapshot taken at block 404 of the program 400). For example, if a configuration update event has already occurred, the event handler 210 uses the snapshot taken by the example component capturer 204 and restores the configuration information to a previous state (e.g., the state when the snapshot was taken).

At block 620, the guest agent 116 transmits an alert to a security manager with the context information (e.g., collected at block 606). For example, when the event handler 210 has blocked a configuration update event (block 616) and/or restored the virtual machine (block 618), the example guest agent interface 202 of FIG. 2 transmits an alert to the security manager 118 of FIGS. 1 and/or 3. In some examples, the alert includes details of the configuration update event, the context information, whether the configuration update event was blocked or the virtual machine was restored, whether the configuration update event was included in the policy, and/or any other information needed by the security manager 118.

At block 622, the guest agent 116 determines whether to continue monitoring the virtual machine 114. When the guest agent 116 determines that it will continue monitoring the virtual machine 114, control of program 414 returns to block 602. On the other hand, if the guest agent 116 determines that it will discontinue monitoring of the virtual machine 114, the program 414 concludes and control returns to block 416 of program 400.

Figure 7:
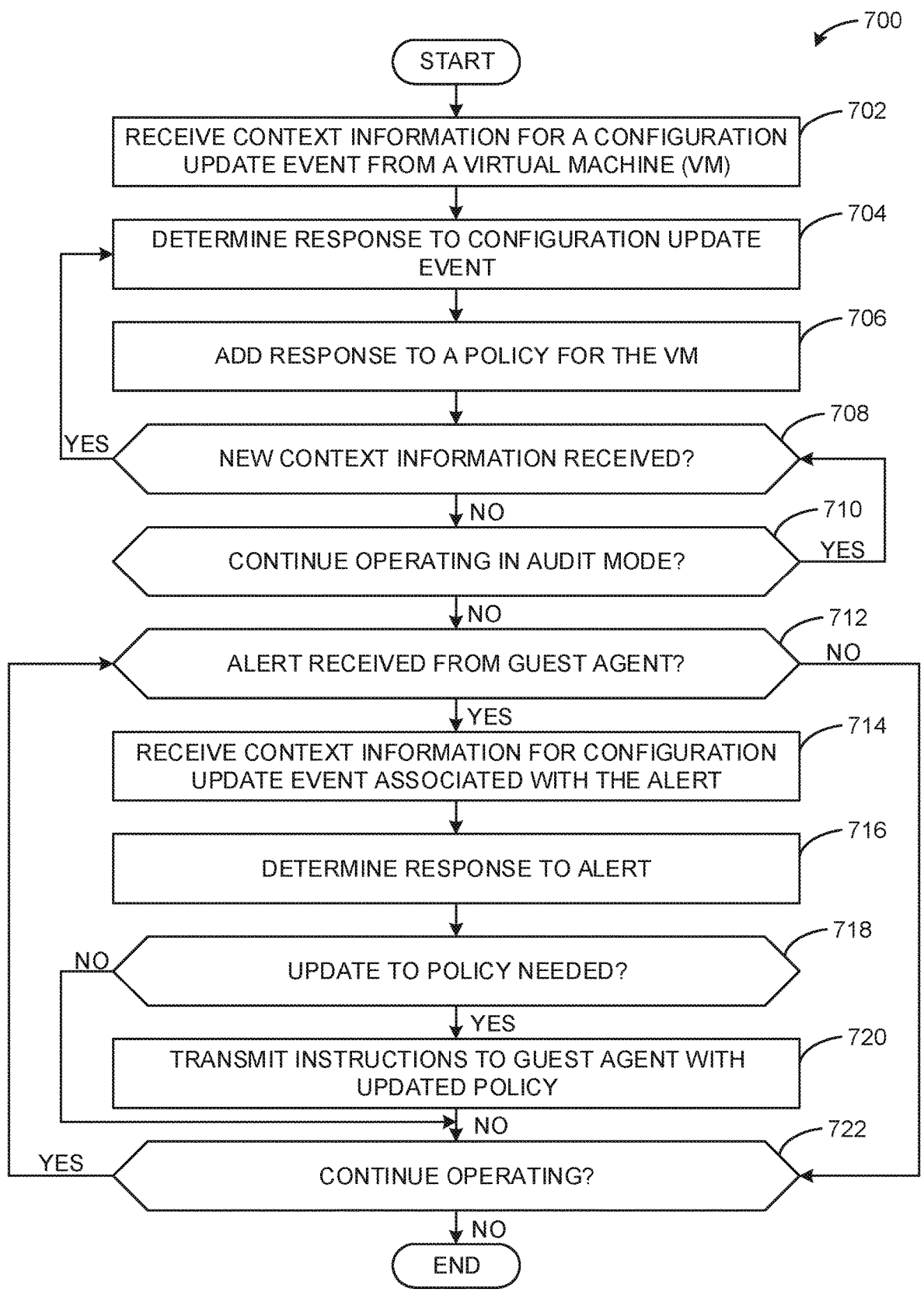
FIG. 7 is a flowchart representative of machine readable instructions which may be executed to implement the example security manager of FIGS. 1 and/or 3 to determine a policy for the example guest agent of FIGS. 1 and 2.

A flowchart representative of example hardware logic, machine readable instructions, hardware implemented state machines, and/or any combination thereof for implementing the security manager 118 of FIG. 3 is shown in FIG. 7. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a flu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of implementing the example security manager 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. FIG. 7 is a flowchart representative of machine readable instructions which may be executed to implement the example security manager 118 of FIGS. 1 and/or 3 to determine a policy for the example guest agent 116 of FIGS. 1 and/or 2. The program 700 begins at block 702, where the security manager 118 receives context information for a configuration update event from a virtual machine (e.g., the virtual machine 114 of FIG. 1). For example, the guest agent 116, when operating in audit mode, collects context information for a detected configuration update event and transmits the context information to the security manager 118 (e.g., blocks 506 and 508 of FIG. 5).

At block 704, the security manager 118 determines a response to the configuration update information. For example, the security manager determines whether the guest agent 116 is to allow an update (e.g., block 612 of FIG. 6), block an update (e.g., block 616 of FIG. 6), or restore a virtual machine (e.g., block 618 of FIG. 6) in response to a particular configuration update event.

At block 706, the security manager 118 adds the response to a policy for the virtual machine 114. For example, as the security manager 118 receives context information (e.g., at block 704) and determines the appropriate responses to the configuration update events, the security manager 118 develops a policy that is to be used in by the guest agent 116 for the virtual machine 114.

At block 708, the security manager 118 determines whether new context information has been received. When new process information has been received (e.g., corresponding to a new configuration update event), control of the program 700 returns to block 704. The program 700 thus continues to add to the policy as new context information is received. When no new context information is received, control of program 700 proceeds to block 710.

At block 710, the security manager 118 determines whether to continue operating in audit mode. In some examples, the security manager 118 ceases operation in audit mode when switching to production mode. In some such examples, a security administrator is prompted to switch from audit mode to production mode (e.g., by pressing a button, etc.). In some such examples, switching from audit mode to production mode at the security manager 118 switches the guest agent 116 from audit mode to production mode. When the security manager 118 determines that it will continue operating in audit mode, control returns to block 708 to determines whether new context information has been received. When the security manager 118 determines that it will cease operating in audit mode, control of program 700 proceeds to block 712.

At block 712, the security manager 118 determines whether an alert has been received from the guest agent 116. When an alert is received from the guest agent 116, control of program 700 proceeds to block 714, and when no alert is received, control proceeds to block 722.

At block 714, the security manager 118 receives context information for a configuration update event associated with the alert. In some examples, the security manager 118 receives further information associated with the alert (e.g., whether the configuration update event is included in the policy, the action taken by the guest agent 116, etc.).

At block 716, the security manager 118 determines a response to the alert. For example, the security manager 118 can determine that the action taken by the guest agent 116 was correct and no corrective action from the security manager 118 is necessary. In some other examples, the security manager 118 transmits instructions to the guest agent 116 to implement a corrective action, change the policy, or take other action. Control then proceeds to block 718, where the security manager 118 determines whether an update to the policy is needed. When the security manager 118 determines that updates to the policy are needed based on the alert, control of program 700 proceeds to block 720. On the other hand, if no updates to the policy are necessary, control of program 700 proceeds to block 722.

At block 720, the security manager 118 transmits instructions to the guest agent 116 with the updated policy. In some examples, the security manager 118 instructs the guest agent 116 to add a new configuration update event to the policy. In some examples, the security manager 118 instructs the guest agent 116 to modify one or more rules in the policy (e.g., change a response to a particular configuration update event).

The security manager 118 then determines whether to continue operating (block 722). When the security manager 118 determines to continue operating, control of program 700 returns to block 712 where the security manager 118 determines whether an alert has been received. If the security manager 118 determines to cease operation, the program 700 concludes.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

In an example implementation, a guest agent loads at early boot and registers for configuration update events from OS (like registry hooks, process create event, monitor firewall rules, etc.). When this guest agent starts it takes a snapshot of critical components (e.g., as a golden image based on the chain of trust). The example guest agent learns the processes which involves in configuration update and report it to the cloud. It includes process binary image path, cryptographic hash, command line information, etc.

There are two modes in which this solution works, Audit Mode and Production Mode. In audit mode there is no policy. The guest agent gathers the process information which are updating the configuration and provide this information to the cloud manager (or validation service) on every update. An example administrator analyzes the information, and sends it back to the guest in form of allowed behavior along with the policy (e.g., ALERT/BLOCK_AND_RE-STORE). After this security administrator changes the mode to Production.

In Production Mode, once guest have the allowed behavior and policy, then on every configuration update event it fetches the context information (e.g., Path, Hash, CLI, etc.) of the process/application and compares it with the allowed behavior. If process/application entry matches (Path, Hash, CLI, etc.) then access is granted for the update. If the guest agent found the mismatch then the guest agent takes the action based on the policy (e.g., ALERT_BLOCK_AND_RESTORE). For ALERT, it sends the process information that is trying to update the configuration to the cloud manager. For BLOCK_AND_RESTORE, if the application was tampered/updated and if its hash is mismatched then the guest agent blocks its access and restores the binary from the snapshot and restart. ALERT will also be send to cloud manager (or validation service). If the guest agent does not find the application entry in an allowed set, then the guest agent simply blocks the access and sends ALERT to cloud manager (or validation service). security administrator will analyze all the ALERT raised by agent and take action on it. The security administrator can add these ALERT as allowed behavior and send back to the guest agent. Additionally, a false positive ALARM gets suppressed by distributed policy management at cloud manager side where a micro service keeps track of updated process information and forward feed by the security administrator.

Figure 8:
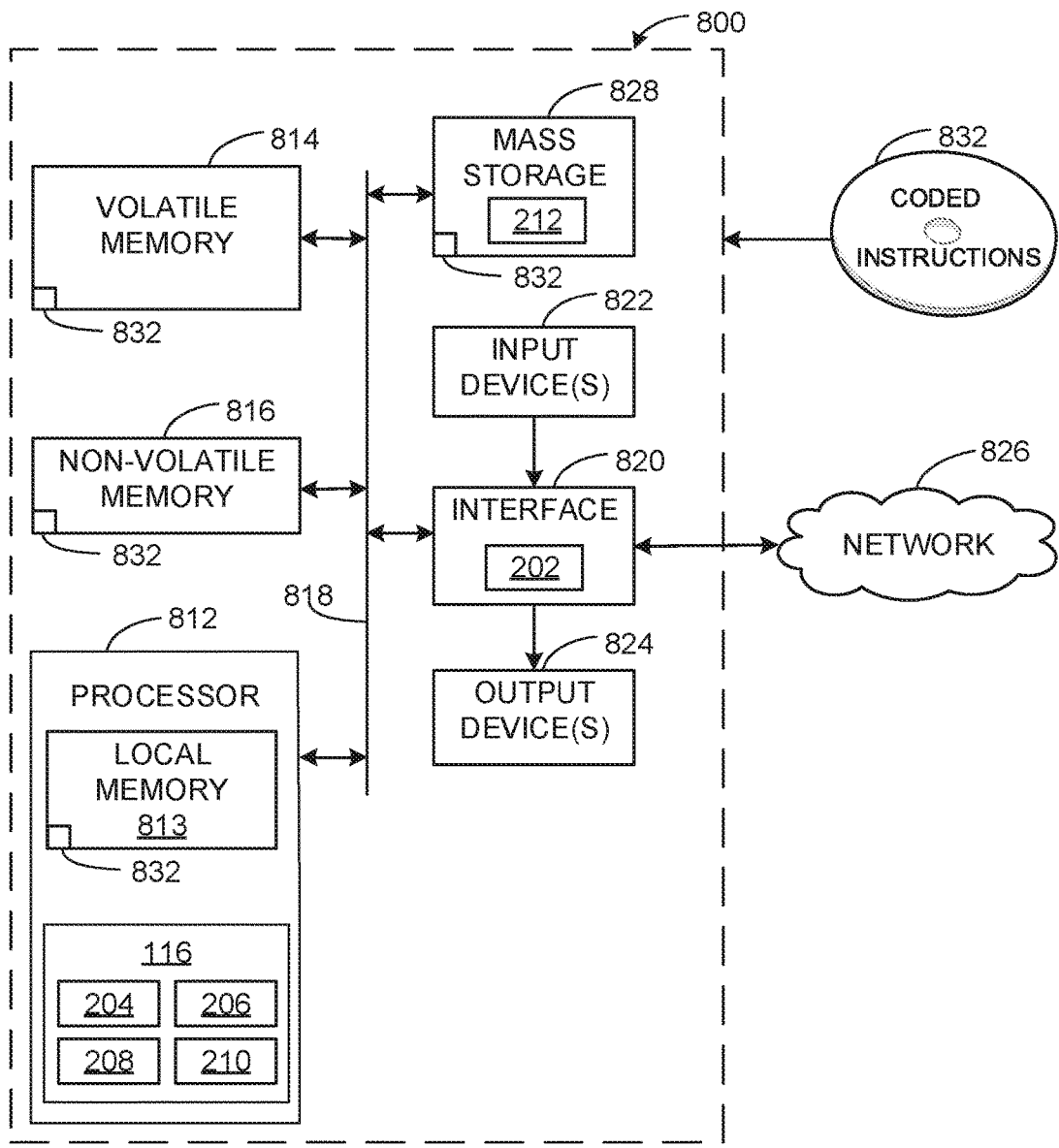
FIG. 8 is a block diagram of an example processing platform structured to execute the instructions of FIGS. 4-6 to implement the example guest agent of FIGS. 1 and/or 2.

FIG. 8 is a block diagram of an example processor platform 800 structured to execute the instructions of FIGS. 4-6 to implement the guest agent 116 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component capturer 204, the example context identifier 206, the example event comparator 208, and the example event handler 210.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4-6 may be stored in the mass storage device 828, in the volatile memory 814, in the non-volatile memory 816, and/or on a removable non-transitory computer readable storage medium such as a CD or DVD.

Figure 9:
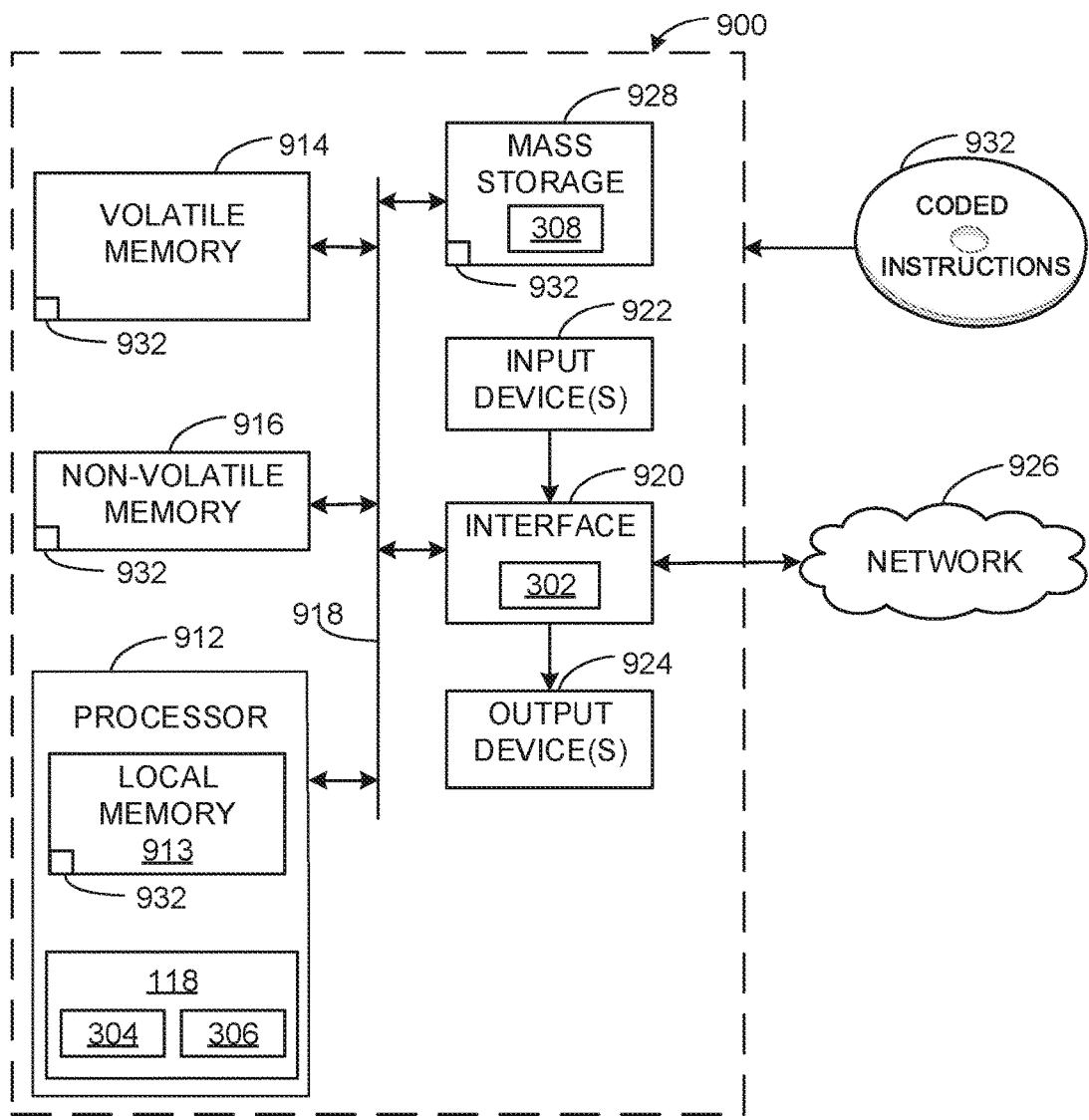
FIG. 9 is a block diagram of an example processing platform structured to execute the instructions of FIG. 7 to implement the example security manager of FIGS. 1 and/or 3.

FIG. 9 is a block diagram of an example processor platform 900 structured to execute the instructions of FIG. 7 to implement the security manager 118 of FIGS. 1 and/or 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example response determiner 304 and policy generator 306.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAN/BUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 9 may be stored in the mass storage device 928, in the volatile memory 914, in the non-volatile memory 916, and/or on a removable non-transitory computer readable storage medium such as a CD or DVD.

From the foregoing, it will be appreciated that example methods and apparatus to validate and restore machine configurations are disclosed herein. In some examples, undesirable updates to virtual machine configurations are blocked, preventing alterations to the configuration of the virtual machine. In some examples, undesirable updates that have already occurred are reversed by restoring the virtual machine to a previous configuration (e.g., a trusted configuration). When an update to the configuration of the virtual machine occurs that is not included in the policy, examples disclosed herein alert a security manager, which provides instructions to a guest agent installed at the virtual machine. In such examples, the guest agent blocks the update until instructions are received from the security manager. Thus, the examples disclosed herein ensure all configuration update events that occur within the virtual machine are authorized, instead of attempting to prevent specific attacks and/or threats. Further, the examples disclosed herein continue updating the policy throughout operation of the virtual machine, thereby continuously learning new allowed behaviors of the virtual machine.

The examples disclosed herein further provide improvements in computer functionality and allow a computer security system to do things it could not do before. For example, the disclosed examples employ a new kind of procedure that enables a computer security system to address security concerns (e.g., updates to critical configurations of virtual machines) and take action in response to those concerns immediately by blocking an update, restoring a virtual machine when an event has already taken place, etc. Additionally, the disclosed examples continuously update the policy based on learned feedback. For example, when a new configuration update event occurs that is not included in the policy, the guest agent may transmit context information associated with the new configuration update event to a security manager to generate an updated policy. In such examples, the security manager transmits the updated policy to the guest agent so that the guest agent is able to address such configuration update events during subsequent monitoring of a virtual machine or other computing device. Thus, the disclosed examples improve computer functionality by dynamically updating a policy used to address configuration update events occurring on a computing device, providing thorough and more effective responses of the computing device to potential security threats.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    memory to store executable instructions;
    at least one processor to execute the executable instructions stored in memory to:
        obtain first context information for a first set of configuration update events occurring on a computing device, the first set of configuration update events obtained from an operating system of the computing device;
        obtain second context information of a first subsequent configuration update event;
        obtain third context information of a second subsequent configuration update event, the second subsequent configuration update event occurring after the first subsequent configuration update event;
    transmit the first set of configuration update events to a security manager for generation of a policy, the policy including allowable configuration update events and responses to unallowable configuration update events;
    compare the second context information of the first subsequent configuration update event to the policy received from the security manager;
    determine whether the first subsequent configuration update event is an event covered by a rule of the policy:
    in response to determining that the first subsequent configuration update event is not in covered by the rule of the policy:
        transmit the first subsequent configuration update event to the security manager for generation of an updated policy; and enable, based on the updated policy, a comparison between the third context information of the second subsequent configuration update event to the updated policy, the at least one processor to determine, based on the comparison, whether to transmit the second subsequent configuration update event to the security manager for generation of a second updated policy.

2. The apparatus of claim 1, wherein the at least one processor is to allow the first subsequent configuration update event when the second context information of the first subsequent configuration update event matches an allowable configuration update event included in the policy.

3. The apparatus of claim 1, wherein the at least one processor is to block the first subsequent configuration update event when the second context information of the first subsequent configuration update event matches an unallowable configuration update event included in the policy and the first subsequent configuration update event has not occurred.

4. The apparatus of claim 1, wherein the at least one processor is to restore the computing device to a previous configuration based on a snapshot when the second context information of the first subsequent configuration update event matches an unallowable configuration update event included in the policy and the first subsequent configuration update event has occurred.

5. The apparatus of claim 1, wherein the first second, or third context information includes a binary image path or a cryptographic hash.

6. A method comprising:
obtaining first context information for a first set of configuration update events occurring on a computing device, the first set of configuration update events obtained from an operating system of the computing device;
transmitting the first set of configuration update events to a security manager for generation of a policy, the policy including allowable configuration update events and responses to unallowable configuration update events;
obtaining second context information of a first subsequent configuration update event;
comparing the second context information of the first subsequent configuration update event to the policy received from the security manager;
determining, when the first subsequent configuration update event is not covered by a rule of the policy, that the first subsequent configuration update event is to be transmitted to the security manager for generation of an updated policy;
obtaining third context information of a second subsequent configuration update event;
comparing the third context information of the second subsequent configuration update event to the updated policy; and
determining, based on the comparison, whether to transmit the second subsequent configuration update event to the security manager for generation of a second updated policy.

7. The method of claim 6, further including allowing the first subsequent configuration update event when the second context information of the first subsequent configuration update event matches an allowable configuration update event included in the policy.

8. The method of claim 6, further including blocking the first subsequent configuration update event when the second context information of the first subsequent configuration update event matches an unallowable configuration update event included in the policy and the first subsequent configuration update event has not occurred.

9. The method of claim 6, further including restoring the computing device to a previous configuration based on a snapshot when the second context information of the first subsequent configuration update event matches an unallowable configuration update event included in the policy and the first subsequent configuration update event has occurred.

10. The method of claim 6, wherein the first, second, or third context information includes a binary image path or a cryptographic hash.

11. A non-transitory computer readable storage medium comprising instructions that, when executed, cause a computing device to at least:
obtain first context information for a first set of configuration update events occurring on the computing device, the first set of configuration update events obtained from an operating system of the computing device;
transmit the first set of configuration update events to a security manager for generation of a policy, the policy including allowable configuration update events and responses to unallowable configuration update events;
obtain second context information for a first subsequent configuration update event;
compare the second context information of the first subsequent configuration update event to the policy received from the security manager;
determine, when the first subsequent configuration update event is not covered by a rule of the policy, that the first subsequent configuration update event is to be transmitted to the security manager for generation of an updated policy;
obtain third context information of a second subsequent configuration update event;
compare the third context information of the second subsequent configuration update event to the updated policy; and
determine, based on the comparison, whether to transmit the second subsequent configuration update event to the security manager for generation of a second updated policy.

12. The non-transitory computer readable storage medium of claim 11, wherein the instructions, when executed, further cause the computing device to allow the first subsequent configuration update event when the second context information of the first subsequent configuration update event matches an allowable configuration update event included in the policy.

13. The non-transitory computer readable storage medium of claim 11, wherein the instructions, when executed, further cause the computing device to block the first subsequent configuration update event when the second context information of the first subsequent configuration update event matches an unallowable configuration update event included in the policy and the first subsequent configuration update event has not occurred.

14. The non-transitory computer readable storage medium of claim 11, wherein the instructions, when executed, further cause the computing device to restore the computing device to a previous configuration based on a snapshot when the second context information of the first subsequent configuration update event matches an unallowable configuration update event included in the policy and the first subsequent configuration update event has occurred.

15. The non-transitory computer readable storage medium of claim 11, wherein the first, second, or third context information includes a binary image path or a cryptographic hash.

16. A system comprising:
means for transmitting first context information associated with a first set of configuration update events between a computing device and cloud components, the first set of configuration update events obtained from an operating system of the computing device;
means for generating a policy based on the first set of configuration update events received from the computing device, the policy including allowable configuration update events and responses to unallowable configuration update events;
means for processing to:
obtain second context information for a first subsequent configuration update event;
compare the second context information of the first subsequent configuration update event to the policy;
determine, when the first subsequent configuration update event is not covered by a rule of the policy, that the first subsequent configuration update event is to be transmitted for generation of an updated policy;
obtain third context information for a second subsequent configuration update event; and
compare the third context information of the second subsequent configuration update event to the updated policy, the means for processing to determine, based on the comparison, whether to transmit the second subsequent configuration update event for generation of a second updated policy.

17. The system of claim 16, wherein the means for processing is a first means for processing, further including a second means for processing to transmit the first set of configuration update events.

18. The system of claim 17, wherein the second means for processing is to monitor a section of memory of the computing device and is to prevent modifications to the section of memory.

19. The system of claim 16, wherein the means for processing is to allow the first subsequent configuration update event when the second context information of the first subsequent configuration update event matches an allowable configuration update event included in the policy.

20. The system of claim 16, wherein the means for processing is to block the first subsequent configuration update event when the second context information of the first subsequent configuration update event matches an unallowable configuration update event included in the policy and the first subsequent configuration update event has not occurred.

21. The system of claim 16, wherein the means for processing is to restore the computing device to a previous configuration based on a snapshot when the second context information of the first subsequent configuration update event matches an unallowable configuration update event included in the policy and the first subsequent configuration update event has occurred.

22. The system of claim 16, wherein the first, second, or third context information includes a binary image path or a cryptographic hash.

* * * * *